United States Patent
Kato

(10) Patent No.: US 6,817,106 B2
(45) Date of Patent: Nov. 16, 2004

(54) ELECTRONIC EQUIPMENT HAVING A BUILT-IN ELECTRONIC COMPASS

(75) Inventor: Kazuo Kato, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 10/227,674

(22) Filed: Aug. 26, 2002

(65) Prior Publication Data

US 2003/0041466 A1 Mar. 6, 2003

(30) Foreign Application Priority Data

Sep. 6, 2001 (JP) ........................................ 2001-270281

(51) Int. Cl.$^7$ ........................ G01C 17/28; G04B 47/06
(52) U.S. Cl. ................................ 33/355 R; 33/DIG. 1; 368/10
(58) Field of Search ............................. 33/355 R, 361, 33/DIG. 1; 702/92; 368/10, 11

(56) References Cited

U.S. PATENT DOCUMENTS

| | | | | |
|---|---|---|---|---|
| 4,668,100 A | * | 5/1987 | Murakami et al. | 368/10 |
| 5,269,065 A | * | 12/1993 | Ida | 33/269 |
| 5,521,501 A | * | 5/1996 | Dettmann et al. | 324/252 |
| 5,600,611 A | * | 2/1997 | Kamens | 368/10 |
| 5,744,956 A | * | 4/1998 | Hawks | 324/253 |
| 5,764,541 A | * | 6/1998 | Hermann et al. | 702/98 |
| 6,014,025 A | * | 1/2000 | Cripe | 324/253 |
| 6,084,406 A | * | 7/2000 | James et al. | 324/253 |
| 6,566,856 B2 | * | 5/2003 | Sandquist et al. | 324/117 R |

FOREIGN PATENT DOCUMENTS

JP 9-318403 * 12/1997 ........... G01D/18/00

* cited by examiner

Primary Examiner—Christopher W. Fulton
Assistant Examiner—R. Alexander Smith
(74) Attorney, Agent, or Firm—Adams & Wilks

(57) ABSTRACT

An electronic equipment having a built-in electronic compass that detects terrestrial magnetism using a magnetic sensor, which is drivable with efficiency, and displays a compass direction (north). In this electronic wrist watch, a comparison means compares a detection value obtained by the first detection with a detection value obtained by the second detection, for instance. The reproducibility judgment means judges whether there exists reproducibility using a result of the comparison. In the case where there exists reproducibility, a pulse width setting means sets a short pulse width for a magnetic field. This makes it possible for a reset means to reset a magnetic sensor using electromagnetic energy that is required to reset the magnetic sensor.

11 Claims, 5 Drawing Sheets

ELECTRONIC EQUIPMENT HAVING A BUILT-IN ELECTRONIC COMPASS

BACKGROUND OF THE INVENTION

1. Field of the Invention

The present invention relates to an electronic equipment, and more specifically, relates to an electronic equipment such as an electronic wrist watch having a built-in function of an electronic compass.

2. Description of the Prior Art

In recent years, electronic wrist watches have been made multifunctional through the advancement of digital techniques, semiconductor manufacturing techniques, and the like. For instance, there is known an electronic wrist watch having a built-in function of an electronic compass that detects terrestrial magnetism and displays a compass direction (north). This electronic wrist watch has a built-in magnetic sensor with which terrestrial magnetism is sensed.

In such an electronic wrist watch, in general, 12 o'clock direction is set as an X axis and 3 o'clock direction is set as a Y axis, and a magnetic sensor is arranged for each coordinate axis. A compass direction (north) is calculated using a detection value (voltage value) concerning a magnetic field (terrestrial magnetism) detected for each axis and the calculated compass direction is displayed.

Also, the display of this compass direction (north) is, for instance, performed for ten seconds in the case where a user selects an electronic compass function. There is a probability that the direction of the wrist watch placed on the user's arm is changed during this display operation (for ten seconds), so that measurement is repeated at predetermined intervals and display is performed.

As this magnetic sensor, there is known a so-called flip-type magneto-resistance sensor. This flip-type magneto-resistance sensor includes a bridge circuit constructed of four magneto-resistance elements. The sensor also includes a flip coil that is formed using an aluminum wiring layer at a position at which the flip coil overlaps each magneto-resistance element in a cross-sectional direction. The magneto-resistance element is an element whose resistance value is changed by a magnetic field, and the resistance value is changed inversely with a square by a magnetic field.

In such a flip-type magneto-resistance sensor, a magnetic substance constituting each magneto-resistance element is magnetized in a predetermined direction by pulse-shaped flip current to drive a flip coil. Following this, the bridge circuit is driven, thereby detecting a voltage value that is changed by the effect of terrestrial magnetism. The flip coil has a function of refreshing the magnetization of the magneto-resistance elements each time measurement is performed.

In general, there is used flip current that is several hundred to one ampere and has a pulse width of several [$\mu$sec] to several ten [$\mu$sec]. This pulse width corresponds to the aforementioned predetermined intervals during measurement. In the case where the compass direction (north) is displayed for ten seconds, for instance, terrestrial magnetism is measured at several [$\mu$sec] to several ten [$\mu$sec].

Also, the flip current has a characteristic that the reproducibility of a detection value concerning a magnetic field that is obtained each time flip driving is performed is degraded in accordance with the reduction of a pulse width. Respective samples have different threshold values concerning this pulse width. Therefore, in many cases, in consideration of variations due to mass production, there is used a construction where flip driving is performed while setting the pulse width at a fixed value of 10 [$\mu$sec].

It should be noted here that the aforementioned flip-type magneto-resistance sensor that detects changes of a magnetic field with reference to a single axis is disclosed in PCT/EP94/01789 (U.S. Pat. No. 5,521,501 B, JP 8-503778 A).

However, the magnetic sensor used in a conventional electronic equipment, such as an electronic wrist watch, exhibits different minimum pulse widths of flip current for respective samples. Therefore, if flip driving is performed by uniformly setting the pulse width at a fixed value of 10 [$\mu$sec], the pulse current becomes larger than electromagnetic energy that is required to magnetize the magnetic resistance elements and to reset the magnetization, which leads to a problem in that the pulse current is wasted and efficiency is reduced.

For instance, even in the case of a sample for which a stable magnetic field detection output is obtained even at 2 [$\mu$sec], driving is performed at the fixed value of 10 [$\mu$sec] at all times, so that there occurs a problem in that a pulse current of 8 [$\mu$sec] corresponding to the difference is wasted and efficiency is reduced. This imposes limitations on the reduction of flip driving power.

SUMMARY OF THE INVENTION

Therefore, the present invention has been made to solve the problems described above, and the object of the present invention is to provide an electronic equipment having a built-in electronic compass that detects terrestrial magnetism using a magnetic sensor, which is drivable with efficiency, and displays a compass direction (north).

In order to achieve the above-mentioned object, according to the present invention, there is provided an electronic equipment comprising: a magnetic sensor that detects terrestrial magnetism; a compass direction calculation means for determining a compass direction by performing calculation on a detection value of the magnetic sensor; a compass direction display means for displaying the compass direction determined by the compass direction calculation means on a screen; and a reset means for resetting the magnetic sensor by having a magnetic field with a pulse waveform generated at predetermined intervals prior to detection of the terrestrial magnetism, characterized in that the electronic equipment comprises: a comparison means for comparing a detection value, which is detected by the magnetic sensor each time the reset means performs the resetting, with a detection value concerning the displayed compass direction; a reproducibility judgment means for judging that there exists reproducibility if a matching result is obtained as a result of the comparison, and judging that there exists no reproducibility if a non-matching result is obtained; and a pulse width setting means for setting a short pulse width for a magnetic field for resetting the magnetic sensor if there exists reproducibility.

With this construction, it becomes possible to change the pulse width of flip current in accordance with the electromagnetic energy that is required to magnetize and reset magneto-resistance elements. As a result, it becomes possible to perform flip driving in accordance with variations of a pulse width of flip current due to samples and to efficiently supply pulse current without causing waste. Accordingly, with the technique of the present invention, it becomes possible to provide an electronic equipment having a built-in electronic compass that detects terrestrial magnetism using a magnetic sensor, which is drivable with efficiency, and displays a compass direction (north).

Note that, it is preferable that the reproducibility judgment means stores a reproducibility existing flag if there exists reproducibility and stores a reproducibility non-existing flag if there exists no reproducibility. It is preferable that after a first detection of the terrestrial magnetism, the reproducibility judgment means temporarily sets the flag to the reproducibility non-existing flag.

Also, after a first detection of the terrestrial magnetism, the pulse width setting means may set a short pulse width during a second detection of the terrestrial magnetism. Further, an electronic equipment may comprise a flag conformation means that confirms the flag prior to the second and subsequent detections of the terrestrial magnetism and has the pulse width setting means set a long pulse width if the flag stored during a previous confirmation is the reproduciblity non-existing flag. In this case, it is preferable that the flag confirmation means increments the pulse width by basic units which are defined herein as predetermined increments added to the pulse width to achieve the desired result.

Also, if the reproducibility existing flag is set, the flag confirmation means may have detection of the terrestrial magnetism performed using a currently set pulse width. If the reproducibility judgment means has judged that there exists no reproducibility, the pulse width setting means may store a currently set pulse width and set a long pulse width. Also, it is preferable that after the detection of the terrestrial magnetism is performed using a long pulse width, the pulse width setting means returns the long pulse width to the stored pulse width. Further, it is preferable that an electronic equipment comprises an initial value setting means for setting an initial value for the pulse width, and during the first detection of the terrestrial magnetism, the initial value is read and the detection is performed.

According to the present invention, there is provided an electronic equipment comprising: a magnetic sensor to detect terrestrial magnetism, a compass direction calculation circuit to determine a compass direction by performing calculation on a detection value of the magnetic sensor; a compass direction display to display the compass direction determined by the compass direction calculation circuit on a screen, a reset circuit to reset the magnetic sensor by having a magnetic field with a pulse waveform generated at predetermined intervals prior to detection of the terrestrial magnetism, a comparator to compare a detection value, which is detected by the magnetic sensor each time the reset circuit performs the resetting, with a detection value concerning the displayed compass direction; a reproducibility judgment circuit to judge that there exists reproducibility if a matching result is obtained as a result of the comparison, and judging that there exists no reproducibility if a non-matching result is obtained; and a pulse width setting circuit to set a short pulse width for a magnetic field for resetting the magnetic sensor if there exists reproducibility.

BRIEF DESCRIPTION OF THE SEVERAL VIEWS OF THE DRAWINGS

A preferred form of the present invention is illustrated in the accompanying drawings in which.

DETAILED DESCRIPTION OF THE PREFERRED EMBODIMENTS

The present invention will be described in detail below with reference to the drawings. Note that in this embodiment mode, an electronic wrist watch having a built-in electronic compass will be described as an example, although there is no intention to limit the present invention to this embodiment mode.

Figure 1:
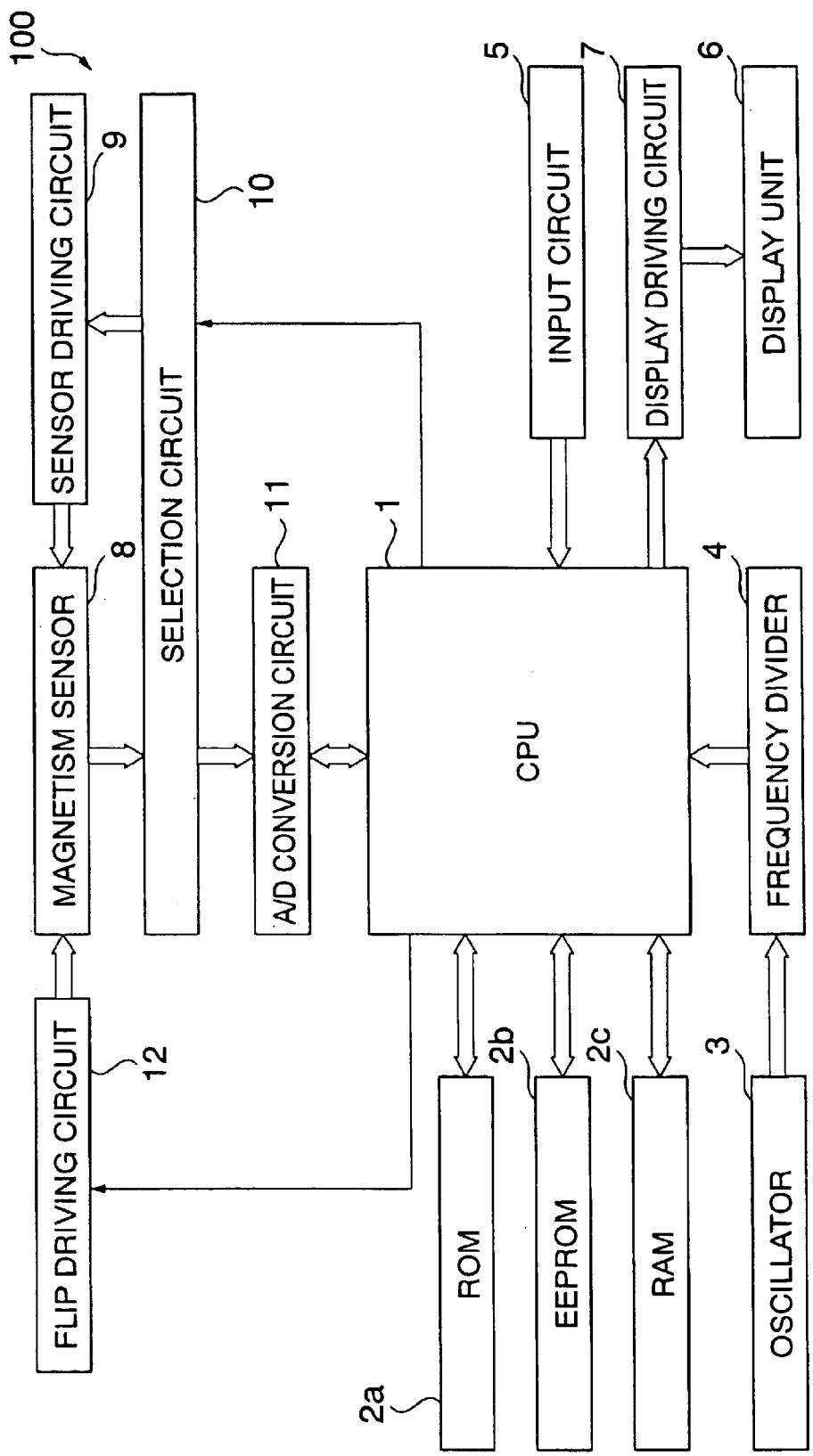
FIG. 1 is a block construction diagram of an electronic wrist watch according to the embodiment mode of the present invention.

FIG. 1 is a block construction diagram of an electronic wrist watch according to this embodiment mode of the present invention. This electronic wrist watch 100 mainly includes a CPU 1 that takes overall control, a ROM 2a, an EEPROM 2b, and a RAM 2c that store various kinds of programs and various kinds of data, an oscillator circuit 3 that oscillates a clock signal for realizing a clock function, a frequency divider circuit 4 that divides the clock signal oscillated by this oscillator circuit 3 into a plurality of frequencies, an input circuit 5 with which a user performs various kinds of operations, a display unit 6 that displays various kinds of data such as a time, a display driving circuit 7 for driving this display unit 6, a magnetic sensor 8 for sensing terrestrial magnetism, a sensor driving circuit 9 for driving this magnetic sensor 8, a selection circuit 10 for selecting one of an X-axis sensor and a Y-axis sensor constituting the magnetic sensor 8, an A/D conversion circuit 11 that converts an analog signal into a digital signal, and a flip driving circuit 12 that supplies the magnetic sensor 8 with flip current having a selected pulse width.

It should be noted here that the CPU 1 is provided with an electronic compass mode in addition to a time display mode, and is capable of performing the switching between these modes. Also, the A/D conversion circuit 11 converts an analog signal into a digital signal with a technique that is, for instance, described in JP 9-318403 A.

Figure 2:
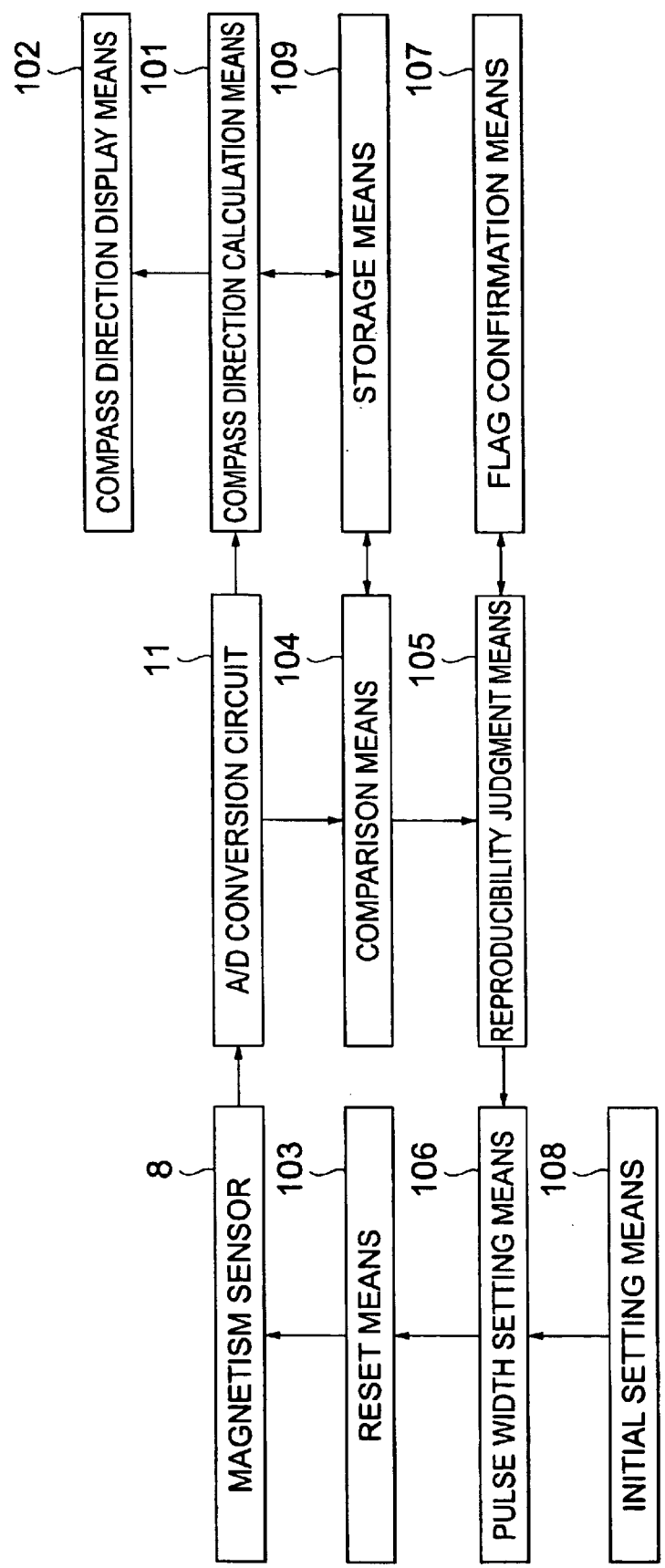
FIG. 2 is a block diagram illustrating the function of a main portion of an electronic compass of the electronic wrist watch according to the embodiment mode of the present invention.

FIG. 2 is a block diagram illustrating the function of a main portion of the electronic compass of the electronic wrist watch according to this embodiment mode of the present invention. Note that the electronic compass function of this electronic wrist watch 100 is realized by the execution of an electronic compass function realizing program stored in the ROM 20a or the like by the CPU 1.

This electronic wrist watch 100 displays a character indicating a compass direction (north, for instance) on a screen of the display unit 6 using the magnetic sensor 8 that detects terrestrial magnetism, the A/D conversion circuit 11 that converts an analog signal detected by this magnetic sensor 8 into a digital signal, the compass direction calculation means 101 for determining a compass direction by performing calculation on a detection value of the magnetic sensor 8 converted into the digital signal by this A/D conversion circuit 11, and the compass direction display means 102 for displaying the compass direction determined by this compass direction calculation means 101 on the screen.

This electronic wrist watch 100 further includes a reset means 103, a comparison means 104, a reproducibility judgment means 105, and a pulse width setting means 106. The reset means 103 is a function of resetting the magnetic sensor 8 by generating a magnetic field having a pulse waveform at predetermined intervals prior to the detection of terrestrial magnetism. This embodiment mode of the present invention is characterized by that it is possible to change the predetermined intervals described above.

The comparison means 104 is a function of comparing a detection value, which is detected by the magnetic sensor 8 each time the reset means 103 performs the resetting, with a detection value concerning a displayed compass direction. The reproducibility judgment means 105 is a function of judging that there exists reproducibility if a matching result is obtained as a result of the comparison and judging that there exists no reproducibility if a non-matching result is obtained. The pulse width setting means 106 is a function of setting a short pulse width for a magnetic field for resetting the magnetic sensor 8 in the case where there exists reproducibility.

For instance, in this electronic wrist watch 100, the comparison means 104 compares a detection result obtained by the first detection with a detection result obtained by the second detection, and the reproducibility judgment means 105 judges whether there exists reproducibility using the comparison result. In the case where there exists reproducibility, the pulse width setting means 106 sets a short pulse width for the magnetic field, thereby allowing the reset means 103 to reset the magnetic sensor 8 with electromagnetic energy that is required to reset the magnetic sensor 8. Note that the details of this processing will be described later with reference to a flowchart.

Also, the reproducibility judgment means 105 stores a reproducibility existing flag in the RAM 2c or the like in the case where there exists reproducibility, and stores a reproducibility non-existing flag therein in the case where there exists no reproducibility. It is preferable that the reproducibility judgment means 105 temporarily sets the reproducibility non-existing flag after the first detection of terrestrial magnetism. Also, the pulse width setting means 106 may set a short pulse width during the second detection of terrestrial magnetism after the first detection of the terrestrial magnetism.

The electronic wrist watch 100 further includes a flag confirmation means 107 for confirming which flag is stored, prior to the second and later detections of terrestrial magnetism. The flag confirmation means 107 also has the pulse width setting means 106 set a long pulse width in the case where the flag stored during a previous confirmation is the reproducibility non-existing flag.

It is preferable that this flag confirmation means 107 increments a pulse width by basic units. As will be described later, there is a case where the pulse width is incremented by "+1" from an initial value "0", although the present invention is not limited to this and the pulse width may be incremented by "+2" or the like. Also, the present invention is not limited to the construction where the pulse width is incremented from the initial value "0". That is, the final detection value obtained during a previous display may be stored and the pulse width may be incremented from the final detection value.

Also, the flag confirmation means 107 may have the detection of terrestrial magnetism performed using a currently set pulse width in the case of the reproducibility existing flag. In the case where the reproducibility judgment means 106 has judged that there exists no reproducibility, the pulse width setting means 106 stores the currently set pulse width and also sets a long pulse width. Also, it is preferable that after the detection of terrestrial magnetism using the long pulse width, the pulse width setting means 106 returns the long pulse width to the stored pulse width.

The electronic wrist watch 100 further includes an initial value setting means 108 for setting the aforementioned initial value for the pulse width. This initial value setting means 108 is an initial value for performing reading and setting during the first detection of terrestrial magnetism. For instance, in this embodiment mode, the initial value is 10 [μsec]. Note that the storage means 109 is a function of writing a detection value into the RAM 2 and reading the detection value therefrom.

Figure 3A:
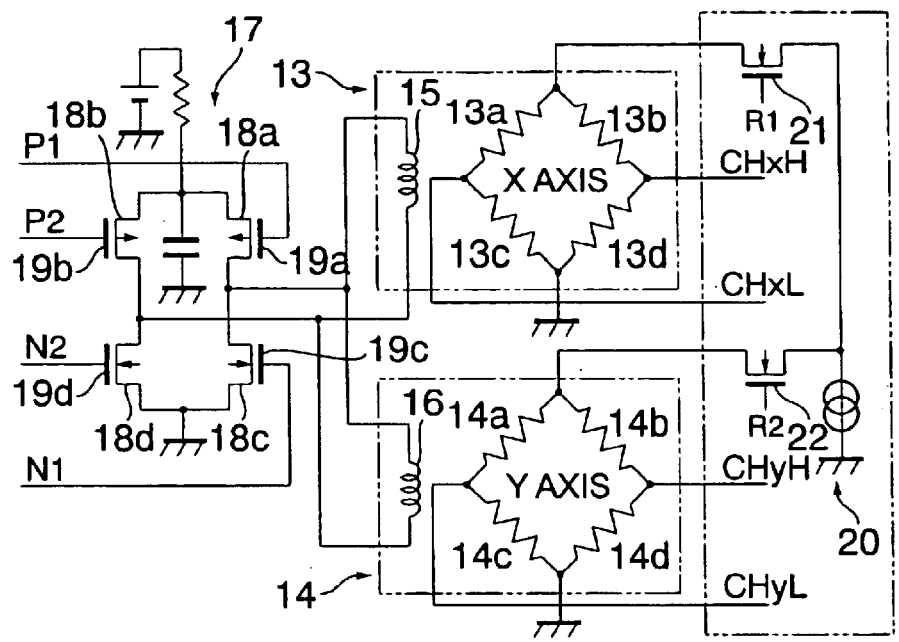
FIG. 3 are drawings illustrating a magnetic sensor built in the electronic wrist watch according to the embodiment mode of the present invention.
Figure 3B:
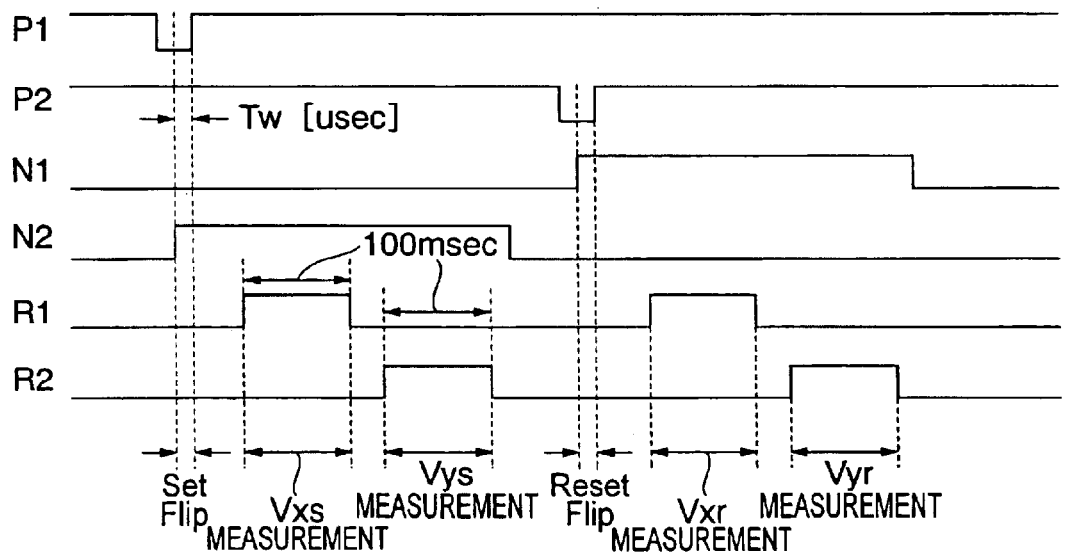
Figure 3C:
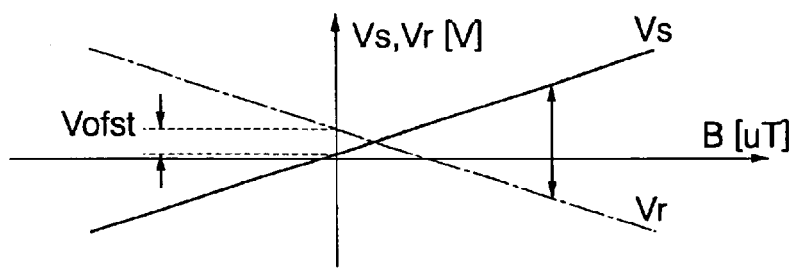

FIG. 3 are drawings illustrating the magnetic sensor built in the electronic wrist watch according to this embodiment mode of the present invention. FIG. 3A is a circuit diagram of the magnetic sensor, FIG. 3B is a timing chart, and FIG. 3C is a V-B graph illustrating a magnetism characteristic.

As shown in FIG. 3A, each of the X-axis sensor 13 and the Y-axis sensor 14 is a magnetic sensor and includes a flip coil (FL) 15, an FL 16, and magneto-resistance elements 13a, 13b, 13c, and 13d and magneto-resistance elements 14a, 14b, 14c, and 14d that are connected to form a Wheatstone bridge. Also, the connection point between the magneto-resistance elements 13c and 13d is connected to a ground terminal, and the connection point between the magneto-resistance elements 14c and 14d is connected to a ground terminal.

Also, there is outputted a voltage representing a magnetic field in the X-axis direction detected using CHxH extracted from between the magneto-resistance elements 13b and 13d and CHxL extracted from between the magneto-resistance elements 13c and 13d. This voltage is converted into a digital value by the A/D conversion circuit 11 existing at a subsequent stage. On the other hand, there is outputted a voltage representing a magnetic field in the Y-axis direction detected using CHyH extracted from between the magneto-resistance elements 14b and 14d and CHyL extracted from between the magneto-resistance elements 14c and 14d. This voltage is converted into a digital value by the A/D conversion circuit 11 existing at the subsequent stage.

The switching circuit 17 is a circuit for switching the direction of flip current flowing to the flip coils 15 and 16. This switching circuit 17 has a construction where there are connected PchMOS-type transistors 18a and 18b and NchMOS-type transistors 18c and 18d.

The PchMOS-type transistor 18a is operated by a signal P1 inputted into a gate terminal 19a. The PchMOS-type transistor 18b is operated by a signal P2 inputted into a gate terminal 19b. The NchMOS-type transistor 18c is operated by a signal N1 inputted into a gate terminal 19c. The NchMOS-type transistor 18d is operated by a signal N2 inputted into a gate terminal 19d.

The drain terminals of the PchMOS-type transistor 18a and the NchMOS-type transistor 18c are connected to each other and are connected to one ends of the flip coils 15 and 16. The drain terminals of the PchMOS-type transistor 18b and the NchMOS-type transistor 18d are connected to each other and are connected to the other ends of the flip coils 15 and 16.

That is, by switching the polarities of the drain terminals of the PchMOS-type transistor 18a and the NchMOS-type transistor 18c and the polarities of the drain terminals of the PchMOS-type transistor 18b and the NchMOS-type transistor 18d, there is switched the direction of current flowing to the flip coils 15 and 16. In this manner, there is switched the direction of a magnetic field to be generated.

It should be noted here that in this embodiment mode, an operation, which is performed when the signal P1 is L, the signal P2 is H, the signal N1 is L, and the signal N2 is H, is called "set flip". Also, an operation, which is performed when the signal P1 is H, the signal P2 is L, the signal N1 is H, and the signal N2 is L, is called "reset flip".

Meanwhile, the A/D conversion circuit 11 includes NchMOS-type transistors 21 and 22 that are switching elements for operating the X-axis sensor 13 and the Y-axis sensor 14. The NchMOS-type transistors 21 and 22 are connected to a constant current power supply 20 whose one side is connected to the ground. The NchMOS-type transistors 21 and 22 are respectively connected between the magneto-resistance elements 13a and 13b and between the magneto-resistance elements 14a and 14b.

The NchMOS-type transistor 21 is operated by a signal R1. Also, the NchMOS-type transistor 22 is operated by a signal R2. In this embodiment mode of the present invention, the length of time, during which the signals P1 and P2 become L, is changeable, thereby making it possible to perform measurement with an optimum pulse width tw. Note that when the signal P1 is L and the signal N2 is H or when the signal P2 is L and the signal N1 is H, there is shown the pulse width tw for the set flip or the reset flip.

Also, as shown in FIG. 3B, first, the CPU 1, a control unit not shown, set the signal P1 at L and set the signal N2 at H, thereby having the flip coils 15 and 16 operate and generate a flip magnetic field. Next, the CPU 1 brings the MOS-type transistor 21 into conduction using the gate signal R1 and has the X-axis sensor 13 detect a magnetic field (terrestrial magnetism) and output a voltage Vxs from CHxH–CHyL. Also, the CPU 1 brings the MOS-type transistor 22 into conduction using the gate signal R2 and has the Y-axis sensor 14 detect a magnetic field (terrestrial magnetism) and output a voltage Vys from CHyH–CHyL. The unillustrated selection circuit 10 switches between the X-axis sensor and the Y-axis sensor, thereby transmitting the outputted voltages Vxs and Vys in succession to the A/D conversion circuit 11 existing at the subsequent stage. The A/D conversion circuit 11 converts the voltages Vxs and Vys into digital values and outputs these values to the CPU 1.

Next, the CPU 1 sets the signal P2 at L and sets the signal N1 at H, thereby having the flip coils 15 and 16 operate and generate a flip magnetic field whose direction is opposite to the direction of the previous flip magnetic field. Then, the CPU 1 brings the MOS-type transistor 21 into conduction using the gate signal R1 and has the X-axis sensor 13 detect the magnetic field and output a voltage Vxr from CHxH––CHyL. Also, the CPU 1 brings the MOS-type transistor 22 into conduction using the gate signal R2 and has the Y-axis sensor 14 detect the magnetic field and output a voltage Vyr from CHyH–CHyL. The unillustrated selection circuit 10 switches between the X-axis sensor and the Y-axis sensor, thereby transmitting the outputted voltages Vxr and Vyr in succession to the A/D conversion circuit 11 existing at the subsequent stage. The A/D conversion circuit 11 converts the voltages Vxr and Vyr into digital values and outputs these values to the CPU 1.

Meanwhile, as shown in FIG. 3C, as to Vs (Vxs, Vys) and Vr (Vxr, Vyr) outputted in the manner described above, straight lines Vs and Vr, whose plus and minus of inclination with reference to the magnetic field (terrestrial magnetism) B [uT] differ from each other, are drawn by the magnetization of the magneto-resistance elements in a predetermined direction or in a direction that is opposite to the predetermined direction by the flip magnetic field of the flip coils 15 and 16. Then, Vs-Vr is set as a detection voltage of the magnetic field and Vs-Vr of a zero magnetic field is expressed as an offset voltage Vofst. Note that this calculation is performed by the CPU 1.

Figure 4:
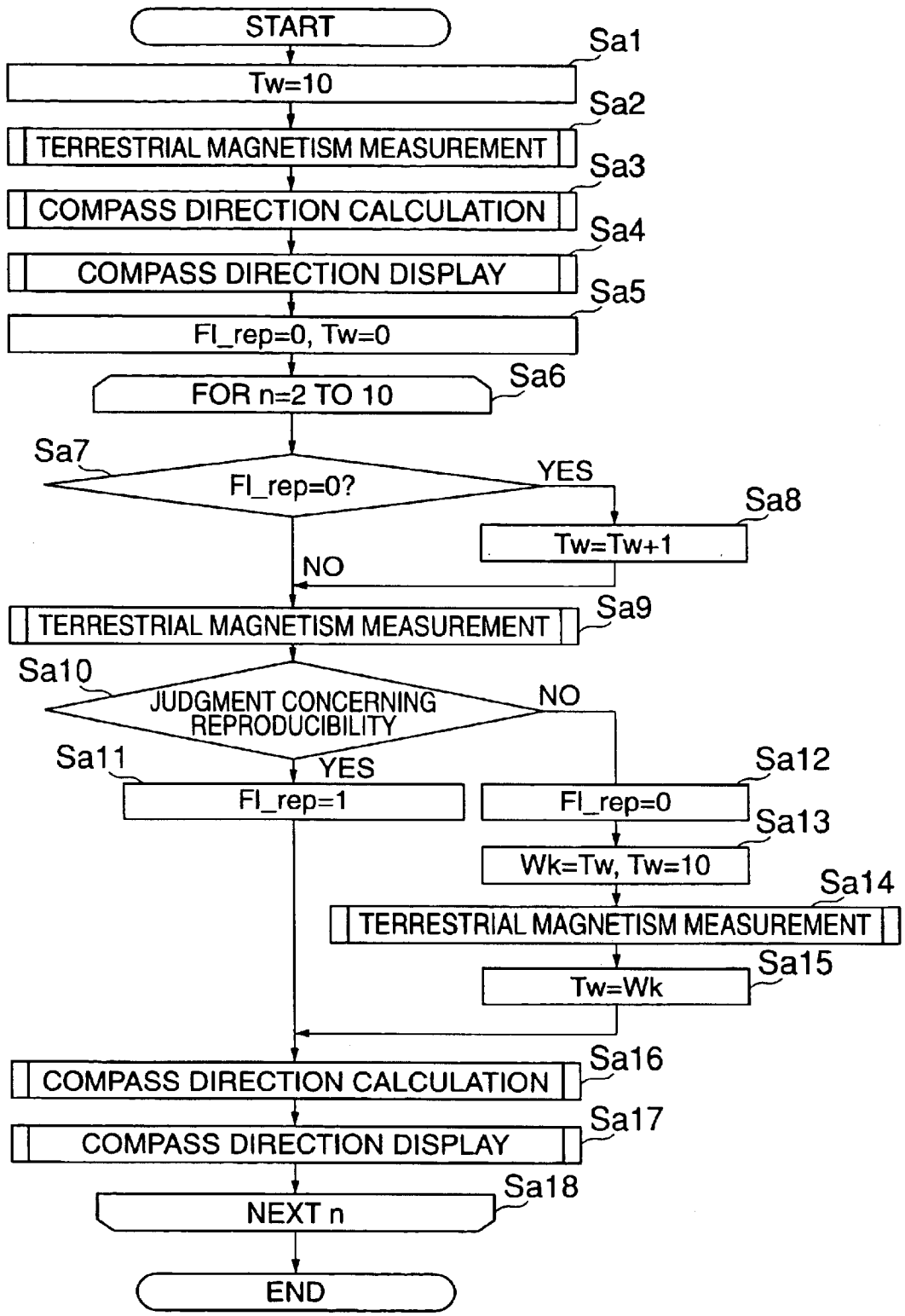
FIG. 4 is a flowchart illustrating a method of driving the magnetic sensor built in the electronic wrist watch according to the embodiment mode of the present invention.

FIG. 4 is a flowchart illustrating a method of driving the magnetic sensor built in the electronic wrist watch according to this embodiment mode of the present invention. Note that in the following description, it is assumed that each processing realizes each functional means described above by the execution of the electronic compass function program by the CPU 1. First, when a user selects the electronic compass mode from the input circuit 5 by operating unillustrated buttons, the CPU 1 switches from a display mode, such as a time mode, to the electronic compass mode.

The CPU 1 reads the initial value 10 [$\mu$sec] of the pulse width tw stored in the RAM 2c or the like (step Sa1) and issues an instruction to the sensor driving circuit 9 and the flip driving circuit 12 via the selection circuit 10, so that the magnetic sensor 8 is driven by flip driving at the initial value of 10 [$\mu$sec] and measures terrestrial magnetism in the manner to be described later (step Sa2). Note that during this operation, the value of a measurement number counter is set as n=1.

Following this, the CPU 1 calculates a compass direction on the basis of a voltage value of measured terrestrial magnetism (step Sa3) and displays the compass direction (north) (step Sa4). After that, the CPU 1 sets the value of the reproducibility flag as fl_rep=0 and sets the value of the pulse width as tw=0 [$\mu$sec] (step Sa5). Here, it is assumed that if the value of the reproducibility flag fl_rep is zero, this expresses that there exists no reproducibility. Also, if the value is one, this expresses that there exists reproducibility.

Next, the CPU 1 continues the processing in the case where the value "n" of the measurement number counter is in a range of from 2 to 10, thereby repeating each step described above until the measurement number counter reaches "10" (steps Sa6 to Sa18).

First, if the value "n" of the measurement number counter stored in the RAM 2c is in a range of from 2 to 10 (step Sa6), the CPU 1 judges whether the value "fl_rep" of the reproducibility flag is zero (step Sa7). If the judgment result is positive (step Sa7, Yes), the CPU 1 increments the value of the pulse width by "+1" (step Sa8).

Following this, after terrestrial magnetism is measured using the set pulse width tw (step Sa9), there is made a judgment about reproducibility (step Sa10). For instance, this judgment about reproducibility is made using the following equation.

$$|Vxr(n)-Vxr(1)| \leq \delta Vxr \qquad \text{Equation}$$

Note that it is enough that an optimum value is predetermined for $\delta Vxr$ by conducting experiments, is stored in the ROM 2a, the EEPROM 2b, or the RAM 2c, is read by the CPU 1 appropriately, and is applied to comparison.

Next, if judging that there exists reproducibility (step Sa10, Yes), the CPU 1 rewrites the value of the reproducibility flag as fl_rep=1 (step Sa11) and performs calculation of the compass direction (step Sa16).

On the other hand, if judging that there exists no reproducibility (step Sa10, No), the CPU 1 rewrites the value of the reproducibility flag as fl_rep=0 (step Sa12), temporarily stores the current pulse width tw as wk in the RAM 2c, and sets the value of the pulse width as tw=10 [$\mu$sec] (step Sa13). Then, the CPU 1 measures terrestrial magnetism while setting the value of the pulse width as tw=10 [$\mu$sec] (step Sa14), returns the value of the pulse width to tw=wk again (step Sa15), and performs calculation of the compass direction (step Sa16).

After the compass direction calculation is finished, the CPU 1 displays the calculated compass direction (north) (step Sa17) and returns to step Sa6 to repeat the processing until the value "n" becomes "10" (step Sa18).

Figure 5:
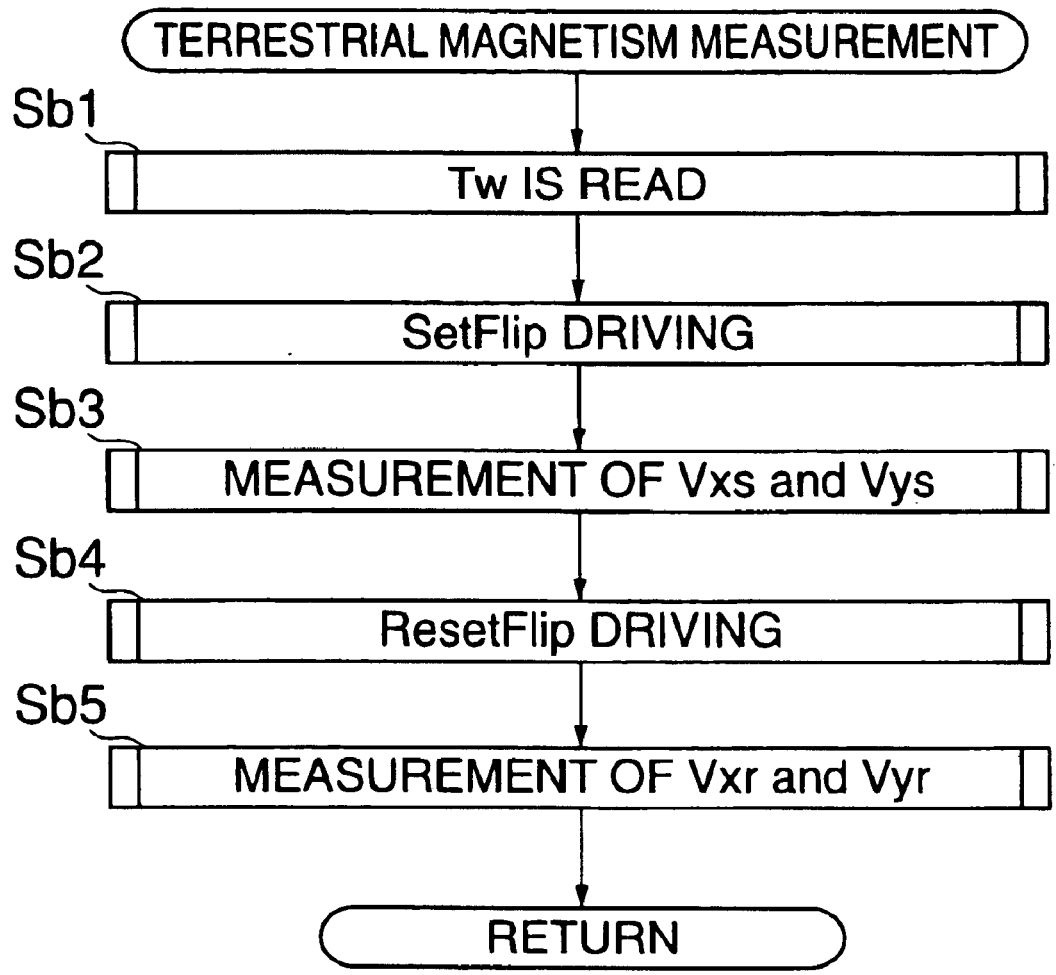
FIG. 5 is a flowchart illustrating a terrestrial magnetism measurement operation of the magnetic sensor built in the electronic wrist watch according to the embodiment mode of the present invention.

Lastly, there will be described the procedure of a terrestrial magnetism measurement operation. FIG. 5 is a flowchart illustrating the terrestrial magnetism measurement operation of the magnetic sensor built in the electronic wrist watch according to this embodiment mode of the present invention.

The CPU 1 reads the pulse width tw stored in the RAM 2c (step Sb1) and drives the flip driving circuit 12 to have flip current flow to the flip coils 15 and 16, thereby performing set flip driving (step Sb2). After that, the CPU 1 drives the sensor driving circuit 9 and measures Vxs and Vys using the magnetic sensor 8 (step Sb3).

Following this, the CPU 1 drives the flip driving circuit 12 to have flip current, whose direction is opposite to the direction of the previous flip current, flow to the flip coils 15 and 16, thereby performing reset flip driving (step Sb4). After that, the CPU 1 drives the sensor driving circuit 9 and measures Vxr and Vyr using the magnetic sensor 8 (step Sb5).

Also, this embodiment mode has been described above by taking the electronic wrist watch as an example. However, it is possible to operate even an independent electronic compass or an electronic equipment other than the electronic wrist watch in the same manner with the same construction, and therefore there is omitted description concerning them. Note that in the case of the electronic compass, the compass direction display is not limited to the aforementioned display of only the north but all of the north, south, east, and west may be displayed.

With the technique of the embodiment mode described above, it is possible to change the pulse width of flip current in accordance with the electromagnetic energy that is required to magnetize and reset magneto-resistance elements. This makes it possible to perform flip driving in accordance with variations of a pulse width of flip current due to samples and to efficiently supply pulse current without causing waste. As a result, with the technique of the embodiment mode described above, it becomes possible to adjust the pulse width of flip driving to an optimum value at any time and thus to reduce power consumed during flip driving.

Effect of the Invention

As described above, with the technique of the present invention, it becomes possible to change the pulse width of flip current in accordance with the electromagnetic energy that is required to magnetize and reset magneto-resistance elements. As a result, there is obtained an effect that it becomes possible to perform flip driving in accordance with variations of a pulse width of flip current due to samples and to efficiently supply pulse current without causing waste. As a result, with the technique of the present invention, it becomes possible to provide an electronic equipment having a built-in electronic compass that detects terrestrial magnetism using a magnetic sensor, which is drivable with efficiency, and displays a compass direction (north).

What is claimed is:

1. An electronic equipment having a built-in electronic compass comprising:
    a magnetic sensor to detect terrestrial magnetism;
    a compass direction calculation means for determining a compass direction by performing calculation on a detection value of the magnetic sensor;
    a compass direction display means for displaying the compass direction determined by the compass direction calculation means on a screen;
    a reset means for resetting the magnetic sensor by having a magnetic field with a pulse waveform generated at predetermined intervals prior to detection of the terrestrial magnetism;
    a comparison means for comparing a detection value, which is detected by the magnetic sensor each time the reset means performs the resetting, with a detection value concerning the displayed compass direction;
    a reproducibility judgment means for judging that there exists reproducibility if a matching result is obtained as a result of the comparison, and judging that there exists no reproducibility if a non-matching result is obtained; and
    a pulse width setting means for setting a short pulse width for a magnetic field for resetting the magnetic sensor if there exists reproducibility.

2. An electronic equipment according to claim 1, wherein the reproducibility judgment means stores a reproducibility existing flag if there exists reproducibility and stores a reproducibility non-existing flag if there exists no reproducibility.

3. An electronic equipment according to claim 2, wherein the reproducibility judgment means temporarily sets the flag to the reproducibility non-existing flag after a first detection of the terrestrial magnetism.

4. An electronic equipment according to claim 3, further comprising:
    a flag confirmation means that confirms the flag prior to the second and subsequent detections of the terrestrial magnetism and has the pulse width setting means set a long pulse width if the flag stored during a previous confirmation is the reproducibility non-existing flag.

5. An electronic equipment according to claim 4, wherein the flag confirmation means increments the pulse width by basic units.

6. An electronic equipment according to claim 4, wherein the flag confirmation means performs detection of the terrestrial magnetism using a currently set pulse width, if the reproducibility existing flag is set.

7. An electronic equipment according to claim 6, the pulse width setting means returns the long pulse width to a stored pulse width after the detection of the terrestrial magnetism is performed using a long pulse width.

8. An electronic equipment according to claim 2, wherein the pulse width setting means sets a short pulse width during a second detection of the terrestrial magnetism after a first detection of the terrestrial magnetism.

9. An electronic equipment according to claim 2, wherein the pulse width setting means stores a currently set pulse width and sets a long pulse width if the reproducibility judgment means has judged that there exists no reproducibility.

10. An electronic equipment according to claim 1, further comprising an initial value setting means for setting an initial value for the pulse width,
    wherein the initial value setting means reads the initial value for performing detection during the first detection of the terrestrial magnetism.

11. An electronic equipment having a built-in electronic compass comprising:
    a magnetic sensor to detect terrestrial magnetism;
    a compass direction calculation circuit to determine a compass direction by performing calculation on a detection value of the magnetic sensor;

a compass direction display to display the compass direction determined by the compass direction calculation circuit on a screen;

a reset circuit to reset the magnetic sensor by having a magnetic field with a pulse waveform generated at predetermined intervals prior to detection of the terrestrial magnetism;

a comparator to compare a detection value, which is detected by the magnetic sensor each time the reset circuit performs the resetting, with a detection value concerning the displayed compass direction;

a reproducibility judgment circuit to judge that there exists reproducibility if a matching result is obtained as a result of the comparison, and judging that there exists no reproducibility if a non-matching result is obtained; and a pulse width setting circuit to set a short pulse width for a magnetic field for resetting the magnetic sensor if there exists reproducibility.

* * * * *